United States Patent [19]
Brown et al.

[11] Patent Number: 5,246,684
[45] Date of Patent: Sep. 21, 1993

[54] METHOD OF EXTRACTING ZINC FROM BRINES

[75] Inventors: Patrick M. Brown, Exton, Pa.; Jerry Dobson, Tucson, Ariz.; James E. Reynolds, Lakewood, Colo.

[73] Assignee: Cyprus Power Company, Englewood, Colo.

[21] Appl. No.: 957,410

[22] Filed: Oct. 5, 1992

[51] Int. Cl.$^5$ .............................................. C22B 3/26
[52] U.S. Cl. ............................... 423/419.1; 423/622; 423/DIG. 19
[58] Field of Search ......... 75/712; 423/100, DIG. 19, 423/419 R, 622

[56] References Cited

U.S. PATENT DOCUMENTS

| | | | |
|---|---|---|---|
| 3,923,976 | 12/1976 | Vega et al, | 423/99 |
| 4,602,820 | 7/1986 | Hard | 75/712 |
| 4,624,704 | 11/1986 | Byeseda | 423/DIG. 19 |
| 4,710,367 | 12/1987 | Wong et al. | 423/DIG. 19 |

OTHER PUBLICATIONS

E. D. Nogueira et al., Complex Sulphide Ores, Pap. Conf., pp. 227-233 (1980).
E. D. Nogueira et al, Engineering and Mining Journal, 180 (10):92-94 (1979).
E. D. Nogueira et al, Chloride Electrometall. Proc. Symp., pp. 59-76 (1982).
E. D. Nogueira et al., Chemistry and Industry, 2:63-67 (1980).
R. W. Bartlett et al, Transactions, 3:39-42 (1979).
A. Maimoni, Geothermics, II(4):239-258 (1982).
F. L. Moor et al., Plat. Surf. Finish., (Aug., 1976).
C. MacDonald, "Solvent Extraction Studies Using High Molecular Weight Amines Progress Report", Texas Southern University, Houston (Jul., 1975).
C. MacDonald, "Removal of Toxic Metals from Metal Finishing Waste Water by Solvent Extraction" Texas Southern University, Houston U7816 (Feb., 1978).
L. Schultze and D. Bauer, "Recovering Zinc-Lead Sulfide from a Geothermal Brine," Rep. Invest., U.S. Dept. Interior, Bureau Mines, RI 8922, 14 pages (1985).
E. P. Farley et al, Gov. Rep. Announce. Index (U.S.), 81(23)4897 (1981).
C. E. Berthold et al, Gov. Rep. Announce. Index (U.S.), 75(16):64 (1975).

*Primary Examiner*—Melvyn J. Andrews
*Attorney, Agent, or Firm*—Howson and Howson

[57] ABSTRACT

The present invention provides an improved method of extracting zinc from geothermal brines and synthetic brines which can be performed in a continuous, in-line process and which provides for the advantageous recycling of $NH_3$ in the process.

24 Claims, 2 Drawing Sheets

METHOD OF EXTRACTING ZINC FROM BRINES

FIELD OF THE INVENTION

This invention relates generally to the field of metal extraction, and more specifically to improved methods of extracting metals from brines.

BACKGROUND OF THE INVENTION

Over the past twenty years, many attempts have been made and described in both patent and scientific literature to successfully extract zinc in an efficient and cost-effective manner from geothermal brines, which contain various mixtures of metals and minerals. Among prior art methods was a process first performed approximately twenty years ago involving the addition of lime to precipitate metals from the brine and subsequently separating the metals. Selective sulfide precipitation was also attempted [R. W. Bartlett et al, "Sulfide Precipitation of Heavy Metals from High Salinity Geothermal Brine," *Geothermal Resource Council, Transactions*, 39–42 (1979)]. A variety of more sophisticated processes were developed, e.g., electrowinning, which involves the use of a water stripping of a $R_2NH_2^+$ extractant followed by reextraction using di-2-ethylhexyl-phosphoric acid (D-2-EHPA) with a catholyte strip, resulting in the formation of zinc sulfate [E. D. Nogueira et al, *Engineering and Mining Journal*, 80(10):92–94 (1979)].

As one example of reportedly unsuccessful prior art, Byeseda, U. S. Pat. No. 4,624,704 refers to a method for selectively recovering zinc from metal-containing brines, which employs the steps of contacting brine with an organic agent to form a zinc amine, and transferring a large amount of the zinc to the organic phase, where it is then contacted with an aqueous strippant solution. While the patent reports that the zinc and zinc amine complex are transferred to an aqueous zinc chloride solution, from which zinc may be recovered by electrowinning, the present inventors have tried this method and found it produces only very low concentrations of zinc in the aqueous phase and long contact and settling times of 5 and 15 minutes, respectively. The concentration and time restraints limit the volume of brines which can be handled by the conventional extracting equipment and thus, the amount of zinc which can be produced. The low zinc concentration and $Cl^-$ accumulation in the strippant which precludes heavy recycle renders a technically-feasible process incapable of practical use. This method is not only not used anywhere in the world to remove zinc from brine, but the assignee of the patent has completely withdrawn from the applicable business.

Another zinc extraction process was disclosed in A. Maimoni *Geothermics*, 11(4):239–258 (1982) involving a cementation process using iron as a reducing agent for cementation. In the practice of this process, a silica sludge accumulates in the equipment and requires periodic removal. It should further be noted that this process was never commercially developed.

Other prior art methods for removing zinc from brines includes, among others, U. S. Pat. No. 3,923,976; E. D. Nogueira et al, *Complex Sulphide Ores, Pap. Conf.*, p. 227–233 (1980); E. D. Nogueria et al, *Chemistry and Industry*, 2:63–67 (1980); F. L. Moor et al, *Plat. Surf. Finish.*, (August 1976); C. MacDonald, "Solvent Extraction Studies Using High Molecular Weight Amines Progress Report", Texas Southern University, Houston (July, 1975); and C. MacDonald, "Removal of Toxic Metals from Metal Finishing Waste Water By Solvent Extraction", Texas Southern University, Houston U7816 (February, 1978). Prior to the present invention, a vast resource of this mineral has been untapped because none of the above-referenced publications are capable of providing a successful process for extracting zinc from brines, which process is able to overcome both scientific and economic obstacles [see, e.g., E. D. Nogueira et al, "Design Features and Operating Experience of The Quimigal Zincex Plant," *Chloride Electrometall., Proc. Symp.*, 59–76 (1982)].

There thus remains a need in the art for a method for extracting zinc from geothermal brines which is both technically and practically feasible, and which permits zinc to be extracted efficiently and quickly from available sources.

SUMMARY OF THE INVENTION

The present invention provides an improved economically advantageous method of recovering metals, particularly zinc, from brines. Under the inventors' designed operating conditions, this process is kinetically much quicker than the processes known in the art, and thus produces a concentrated aqueous zinc strip liquor and can be performed continuously and in an in-line system, rather than by batch, because of the high final zinc concentration and decreased contact time needed between the organic extractant and the brine.

In one aspect, the present invention provides a process which permits the extraction of Zn from a natural or synthetic brine which contains salts of sodium, potassium and calcium chlorides, as well as a number of other elements including manganese, iron, lead, silver, magnesium, strontium and lithium. The ability to rapidly and selectively extract zinc in the presence of many metals so that greater than 90% recovery is obtained is a significant advantage of the method of the invention.

This process comprises several steps, such as, providing Zn in an organic extractant at a concentration of between about 1 to 4 g/L. This step requires that substantially all Fe and Mn be removed from the organic, and then the Zn stripped therefrom using an ammoniacal salt solution to generate a 10–50 g/L zinc concentrate. This process provides an improvement over other processes by substantially completely recovering ammonia from the strippant by a lime boil process. The method is advantageous in that the free ammonia can be recycled into the extraction process, thus adding to the environmental and economic advantages of the process of the invention. It also provides a method for precipitation and further concentration of the zinc values as zinc hydroxide according to the following equation:

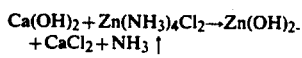

The zinc hydroxide can be filtered, washed, dried and calcined according to the following equation:

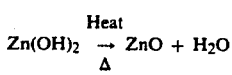

Furthermore, the calcium chloride ($CaCl_2$) solution generated during filtration of the zinc hydroxide $Zn(OH)_2$) can be recycled for stripping, washing and scrubbing in the various steps.

In one embodiment, after substantially all silica is removed, the brine is then run through a circuit or cycle which is made up of the following steps, some of which may be performed more than once during a single cycle:

(1) contacting the brine with a selected organic, e.g., a quaternary amine, to extract Zn therefrom; and thereafter separating the loaded organic from the aqueous brine raffinate;

(2) scrubbing the loaded organic with a dilute brine solution or acidified brine, which removes the co-extracted Fe and Mn from the loaded organic; and (3) stripping the Zn from the scrubbed organic with an ammoniacal $CaCl_2$ solution to produce a concentrated and purified Zn strip solution with a Zn concentration of at least 10 g/L. The improvement to this process is provided by the additional steps of:

(4) reacting the aqueous strip solution with CaO or $Ca(OH)_2$ at elevated temperatures to precipitate $Zn(OH)_2$ and release $NH_3$ for recycle; and (5) washing the stripped organic layer from step (3) with neutral $CaCl_2$ solution to remove $NH_3$ from the organic layer before it is recycled to extraction; washing the resulting organic layer with water and/or HCl and water and acid-neutralizing it; and, optionally acidifying the organic to convert the quaternary amine to the chloride form, maximizing the effectiveness of the quaternary amine extractability.

Thereafter, the process may include the steps of:

(6) filtering the precipitated zinc hydroxide ($Zn(OH)_2$) to generate a wet concentrated cake and a calcium chloride solution; and optionally recycling or reinjecting the calcium chloride solution; and (7) optionally drying the zinc hydroxide to produce zinc oxide concentrate.

In yet another embodiment, the process of the invention is also used to extract Zn from synthetic brines which may contain either Fe or Mn, such as certain waste stream brines. In this embodiment, the extraction process described herein is modified by removing the scrubbing step when Fe and Mn are not present.

Other aspects and advantages of the present invention are described further in the following detailed description of the preferred embodiments thereof.

DETAILED DESCRIPTION OF THE INVENTION

Figure 1:
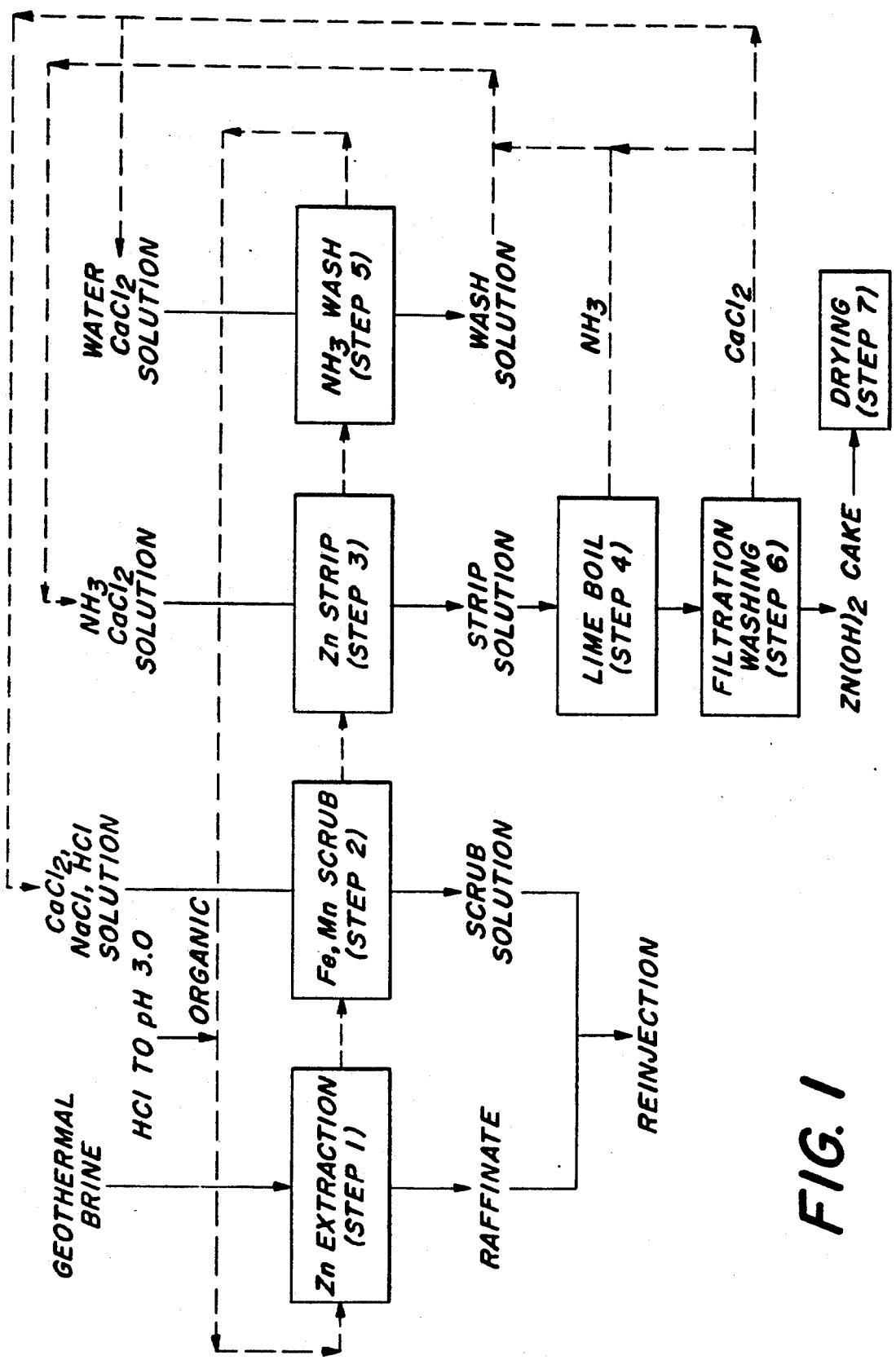
FIG. 1 is a block diagram illustrating a Zinc Solvent Extractions Circuit.

The present invention provides an improved method of extracting zinc (Zn) selectively from a geothermal or synthetic brine which may contain other metal ions including, without limitation, manganese, iron, lead, silver, magnesium, manganese, strontium, calcium, sodium, potassium and lithium. The continuous flow process of this invention enables the zinc to be ultimately recovered as a zinc hydroxide or oxide concentrate. When applied to a natural brine, this process can result in approximately 90% Zn recovery and advantageously recycled $NH_3$ and $CaCl_2$ into the circuit.

A. PREPARATION OF THE GEOTHERMAL BRINE

High temperature, naturally occurring geothermal brine, of which many sources exist in the world, normally contain significant quantities of silica when they are recovered from the earth. As the brines rise to the surface and the pressure decreases, carbon dioxide and hydrogen sulfide are dispelled from the brine. This in turn reduces the acidity of these brines. Various geothermal brines are characterized by different temperature, pressure and mineral content conditions. In one example of a brine which was subjected to the methods of this invention, a geothermal brine capable of producing steam at ground level is characterized by the following conditions: it is between about 230°–260° C. at a pressure of between 450–700 pounds per square inch (psi).

In addition, steam can be withdrawn from the brines for the purpose of energy generation resulting in substantial reductions in temperature from 230° C. to about 70°–110° C. by flashing of the steam in one or more steps or heat exchange with pure water. This process of removal of acid gases and cooling of the brine during removal from the geothermal wells causes silica present in the brine to precipitate.

Where the brine to be subjected to the process of this invention is geothermal, the first step of the process of this invention involves removing the insoluble amorphous silica precipitate from the brine. The silica solids which have precipitated in the brines as a result of cooling and loss of acid gases are desirably removed from the brines prior to the solvent extraction process. Their removal can be achieved through careful and efficient liquid-solid separation techniques.

The resulting pooled brine, which is now substantially free of colloidal silica, is used as the starting material for the zinc removal process. The term "substantially free of colloidal silica" is defined as containing residual amounts of silica of less than 10 ppm. More preferably, the silica content remaining in the pooled brine is in the range of between about 1 to about 10 ppm $SiO_2$. The brine, removed of silica, can optionally be reintroduced into the well from which the geothermal brine was tapped. Without its removal, the costly wells are quickly plugged.

Generally an economically desirable amount of pooled, silica-free brine is employed in the following Zn removal steps. This amount of brine will vary with the Zn concentration in the brine, but may be on the order of about 5000 to about 20,000 gpm.

B. CONTINUOUS ZINC RECOVERY FROM BRINES

Most preferably as described above, the starting material for the zinc extraction cycle is pooled flashed brine which is substantially free of colloidal silica at a temperature of about 70° C.–110° C. and a pressure of about 1 atm.

The continuous method of the present invention for zinc recovery from brines is referred to herein as the solvent extractions (SX) circuit. It consists of a circuit or cycle made up of some or all of the following steps. In practice, the circuit design utilizes a 2-stage counter-current extraction, 2-stage counter-current scrub, and single strip and wash stages. When metal ions which are prone to oxidation and precipitation are used a closed system from which $O_2$ is excluded is preferred.

Step One: Zinc Extraction with Amine

Ordinarily, a geothermal brine, e.g., from the Salton Sea area enters Step 2 of the zinc extraction cycle containing approximately 200 to 800 ppm Zn, and preferably 250–800 ppm Zn.

The first step of the basic process involves contacting the aqueous brine with an organic to extract zinc therefrom. Preferably the ratio of aqueous brine to organic (A/O ratio) for this step ranges from about 2:1 to about 6:1. More desirably, the A/O ratio is from 3.0:1 to 4.5:1, and is preferably about 4:1.

The preferred organic used for Zn extraction is a mixture of an extractant, a modifier and a diluent. The organic extractant used must be stable, resistant to degradation upon prolonged exposure to hot concentrated brine and strip liquor, and virtually water insoluble in both the hot brine and strip liquors. The preferred extractant is a quaternary amine; however, other suitable zinc extractants include solvating extractants, which are useful at 2-3 Molar brines, such as tributyl phosphate (TBP, with aliphatic diluent), di-2-ethylhexylphosphoric acid [D-2-EHPA or DEHP(H)], which is good at low molarity chlorides, versatic and napthenic acid.

Quaternary amine extractants are advantageous over prior art extractants because they are resistant to oxidation and very stable at high temperatures and are selective for Zn. In addition, they allow rapid kinetics of the exchange reaction at high temperatures. In a preferred embodiment, the quaternary amine contains at least three long-chain alkyl groups, each having a carbon chain length of between 6 to 12 carbon atoms. The long chain alkyl groups are necessary to render the quaternary amine soluble in the organic phase and insoluble in the aqueous phase. One example is Aliquat 336, containing a $C_8$ alkyl group [$H_3C(CH_2)_5CHCH_3$], a tricapryl methyl ammonium chloride reagent supplied by Henkel Corp. Note that this quaternary amine has three capryl alkyl chains and one methyl group on the amine. Aliquat 336 is a strong extractant for Zn and ferric iron from brine solutions and has a lesser affinity for extraction of ferrous iron and manganese. Quaternary amines with 1 or 2 long chain alkyl groups may also be useful. Other desirable quaternary amines include other similar low cost, naturally derived products.

In the organic, the amine extractant is preferably mixed with a modifier in a diluent. A selected modifier is preferably a long-chain alkyl (6 C to 20 C) alcohol, such as Exxal 10, an isodecyl alcohol supplied by Exxon. The modifier increases the solubility of the Zn-amine complex in the diluent. A diluent is preferably a low-vapor pressure, low-viscosity mineral oil, in which the amine and modifier are soluble and which is stable at the elevated temperatures of the geothermal brine. As used in connection with the characterization of the diluent herein, low means being sufficiently low to prevent significant losses through vaporization while operating at temperatures of between about 70°–120° C. The diluent may also be mixed with the amine extractant. Diluents may be selected from high boiling, long carbon chain paraffinic hydrocarbons. A preferred diluent is Norpar 15 [Exxon].

Currently, the most preferred organic composition is 10 vol% Aliquat 336 plus 10 vol% Exxal 10 diluted in Norpar 15. One of skill in the art may select another appropriate alternative organic which has the requisite properties, depending upon the characteristics of the brine, operating conditions and value of recovered product.

Zinc ($Zn^{+2}$) in the brine exists as an anionic Zn chloride complex ($ZnCl_4^{-2}$). When the aqueous brine is mixed with the organic recycled from the step 7 of the process to this step (see FIGS. 1 and 2), the anionic zinc chloride complex is strongly extracted from the brine aqueous phase into the organic phase by the quaternary amine. This reaction is represented by the following formula:

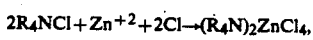

$$2R_4NCl + Zn^{+2} + 2Cl^- \rightarrow (R_4N)_2ZnCl_4,$$

wherein R represents alkyl group and ($R_4N$)Cl is the chloride salt of the quaternary amine.

Besides Zn, the amine also extracts $Fe^{+3}$ strongly and $Fe^{+2}$, Mn, and Pb less strongly from brine solutions into the organic phase. This is particularly true if any oxidation has occurred and the iron and manganese are in higher oxidation states, as the ferrous or manganous ions are not strongly complexed or extracted. Optionally, when the process is performed and the potential for oxygen intrusion occurs, Fe powder, wool, or $SO_2$ may be added to the brine in order to cause reduction of ferric iron to ferrous iron and decrease coextraction with Zn. Typically, when iron or manganese are co-extracted, they precipitate during the subsequent ammonia stripping process, if not removed.

After this Zn extraction step, the organic (now loaded with the Zn) is separated from the aqueous brine raffinate. The raffinate may be reinjected into the original geothermal well from which it was obtained. The loaded organic may proceed in the SX circuit onto Step Two below, or it may be optionally recycled through the extraction step at least one more time (see FIG. 2).

Figure 2:
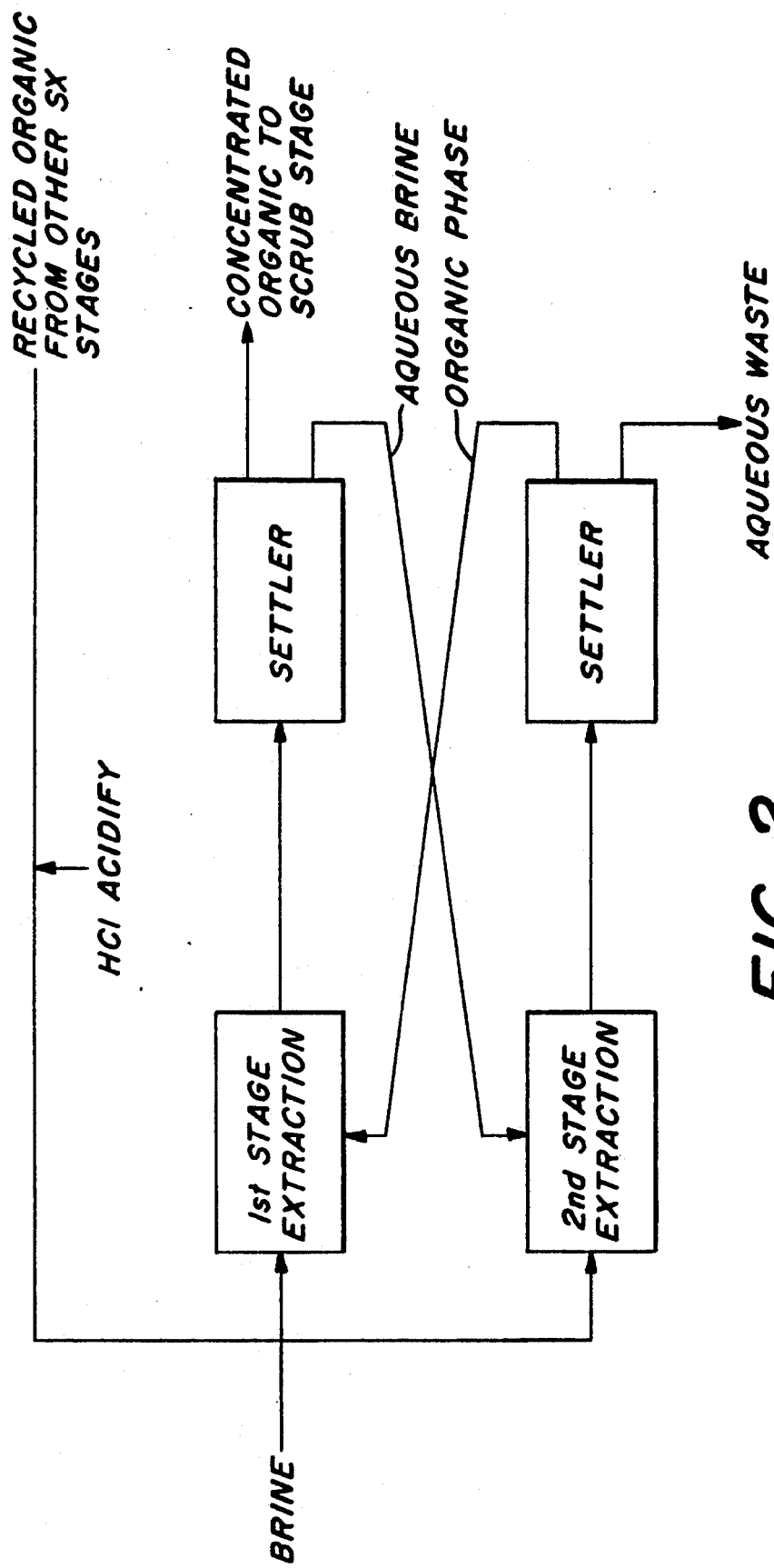
FIG. 2 is a block diagram illustrating an optional two stage counter current Zinc Extraction step useful in step 1 of the overall Circuit of FIG. 1.

FIG. 2 illustrates an optional 2-stage counter current Zn extraction step in which brine initially enters the first stage Zn extraction where it is contacted with organic phase. The aqueous and organic phases are separated in the first settler, from which the organic phase, concentrated with Zn, goes onto the scrub step 2 and the aqueous brine containing minor amounts of Zn enters the second stage extraction. In the second stage extractor, this aqueous phase is contacted with organic recycled from later SX steps and containing substantially no Zn. The organic is recycled after stripping and washing to remove most of the ammonia. The organic, low in ammonia, may be acidified before Zn extraction. The chloride form of the amine is the most effective form for extraction. If its pH were high, the organic would cause some of the amphoteric elements, e.g., Fe and Mn, to precipitate. Thus, immediately prior to recycling for additional Zn extraction, this stripped organic may be acidified, e.g., by a water and then acid wash to a pH of about 3, to convert the amine back to its chloride form. This recycled organic strongly strips the remaining Zn from the brine. The brine then is sent as aqueous waste back for reinjection into the well. The organic phase, containing the small amount of extracted Zn is then used as the organic in the first stage extraction. This process may be recycled as often as desired.

When the Zn extraction of Step One is complete a desired number of times, the loaded organic, separated from the raffinate proceeds to Step Two of the process.

The kinetic advantage of this extraction step contributes significantly to the overall process and permits extraction of as low as about 0.2 g Zn per liter of brine. Generally, the time during which the brine is contacted with the organic extractant preferably ranges from about 5 to about 25 seconds. As one example of the performance of this step, Zn recoveries have ranged from between 60-87% in 15-second contact time at 90°-95° C. using impeller mixing in a single step process. With in-line mixing and a 9 second contact time, 68% Zn extraction has been obtained. Tests on actual brines has shown greater than 90% extraction in 15 seconds or less with a two stage counter current extraction. The advantage to the process created by these rapid kinetics was not previously recognized by the art.

Step Two: Coextracting Fe and Mn

When oxidation and extraction of Fe and Mn occurs in Step One, it may be necessary to wash or "scrub" the organic phase loaded with Zn and co-extracted iron and manganese with a dilute acidified brine solution in order to remove the co-extracted Fe and Mn from the Zn-loaded organic phase. The dilute brine solution may contain a sufficient salt concentration to prevent an emulsion from forming. Preferably this step occurs at a pH of about 2-4.

The impurities are scrubbed from the Zn-loaded organic with the dilute brine solution. At low Cl concentrations, the impurities chloride complexes are stripped from the organic, whereas the Zn complex is not. $SO_2$ may be injected in the scrub stage to reduce any $Fe^{+3}$ extracted to $Fe^{+2}$ which is more easily scrubbed from the organic.

A preferred scrub solution is made up of about 6 gm per liter NaCl and 2 gm per liter $CaCl_2$, adjusted to a pH of about 2 with a suitable acid, such as 0.27 N HCl. For example, for a 50 liter dilute brine solution, the components are 50 liters water, 300 g NaCl, and 132 g $CaCl_2$ flake ($CaCl_2.2H_2O$) which is then pH adjusted.

Thereafter the organic phase can be washed with an acidified salt solution or, e.g., HCl and water, until it achieves a desired iron and manganese level. One of skill in the art may prepare washing solutions with acids and salts in various proportions with water without resort to undue experimentation.

Following this step, a preferred level of each of Fe and Mn is reached in the organic phase, e.g., about 20 ppm or less. The scrub solution may also be reinjected back into the well or recycled back into the circuit at an appropriate place.

Step Three: Stripping Zn from Organic

According to another step of the process of this invention, the Zn is stripped from the scrubbed organic with an ammoniacal salt solution to produce a concentrated and purified Zn strip solution. Stripping is accomplished by adding a suitable strip solution to the above-described extracted and scrubbed organic phase. Zinc is stripped from the organic phase by contacting it with an ammoniacal salt solution to ultimately form the cationic Zn tetraamine complex $Zn(NH_3)_4^{+2}$.

The strip solution is desirably made up of ammonia and a selected salt. While $CaCl_2$ is the presently preferred salt, any other alkali or alkaline earth chloride which does not form a precipitate in the system may be substituted for $CaCl_2$, for example, NaCl, $NH_4Cl$ or KCl. The presence of a salt in the strip solution increases the solubility of the $Zn(NH_3)_4^{2+}$ complex in the strip solution and breaks up any emulsions which might otherwise form.

Preferably the amount of ammonia used in the strip solution is between about 1.5 N to about 3 N $NH_3$ (or $NH_4OH$) with 3N $NH_3$ being presently preferred. The high ammonia content of the strip solution permits good stripping because of the following complex formations:

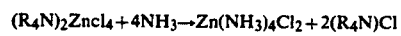

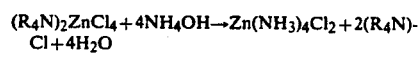

Currently, the preferred strip solution is made up of 55 g/L $NH_3$ and 50 g/L $CaCl_2$. For a 20 liter solution, the components are 15.7 liters water, 1.32 kg calcium chloride flake ($CaCl_2.2H_2O$), and 3.9 kg ammonium hydroxide (26 degree Baume). The reaction and stripping is preferably performed in less than one minute.

The result of the above step is a pregnant or Zn-containing strip solution (aqueous phase) "loaded" with Zn, containing approximately 10-50 g/L Zn, according to performance of the process in the laboratory. This pregnant strip solution is removed by separation from the organic phase.

Step Four: Lime Boil

An improvement in the process is provided by this step, a lime boil. The concentrated strip solution is then treated with a base or basic precipitant at elevated temperature to permit recovery of the zinc therefrom by precipitation and gaseous ammonia for recycle. The pregnant strip solution from the above step is reacted at elevated temperatures in the presence of a preferred base, hydrate of lime, calcium hydroxide, $Ca(OH)_2$. A desired temperature range is from 30° C. to about 80° C. More preferably, the temperature range is between 70° C. and 80° C. This precipitates $Zn(OH)_2$ from the strip solution and releases ammonia for recycle. Alternatively, another base, lime, CaO, may be added and then steam heated to hydrate the lime in situ. Still other preferred bases or precipitants include NaOH and $NaCO_3$. Exemplary resulting reactions are:

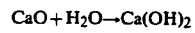

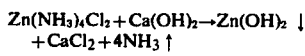

The thusly-formed calcium chloride solution can be used in various steps of the process requiring $CaCl_2$.

Step Five: $NH_3$ Wash

Another improvement of this process is an $NH_3$ wash. This step of the improved SX circuit involves the use of the stripped organic layer resulting from the previous Step 3, which now contains some entrained strip solution and a small amount of extracted ammonia. The stripped organic layer may be washed or reacted once more with a neutral $CaCl_2$ or $NH_4Cl$ solution to completely remove $NH_3$ from the organic layer. Other non-precipitating salts, e.g., KCl or NaCl, may also be employed in this neutral salt solution. A preferred wash solution contains 50 g/L $CaCl_2$. For a 20 liter solution, 20 liters of water is mixed with 1.32 kg calcium chloride flake.

The resulting $CaCl_2$ or $NH_4Cl$ solution (aqueous phase) which contains $NH_3$ is then recycled back to the Zn strip step (Step 3) for reuse. The free $NH_3$ recovered is treated with more $NH_3/H_2O$ and also recycled to the strip step in the circuit. The organic layer is then optionally acidified with HCl to a pH of about 3 to convert the quaternary amine to the neutral, choride form, maximizing the effectiveness of the quaternary amine extractability. This washed organic layer is also recycled back to Step 1, the Zn extraction for reuse in the circuit.

The zinc recovery method according to this invention employs steps for recovering zinc from other natural or synthetic brines, such as those recovered from waste streams. For example, blast furnace dusts contain significant quantities of zinc, from which zinc could be recovered after dissolution. Adaptation of the process of the present invention for removing zinc from synthetic brines offers similar advantages over the processes known to the art. However, because synthetic brines tend not to contain metals, such as lead, iron and manganese, fewer scrubbing steps are required. In some cases, no scrubbing will be required at all. Therefore, this second method is performed utilizing the steps described above, but may omit the scrubbing Step 2 from this process.

Step Six: Zinc Hydroxide Filter

Solid - liquid (S/L) separation is then performed by filtering the strip solution from Step 4 containing the zinc precipitate by known techniques. Preferably, filtration is done by passing the solution through a filter under pressure. The precipitate obtained is then washed with $H_2O$. Alternatively, the zinc precipitate formed as described above in Step 4 and from which ammonia has been removed may be formed into a cake for possible direct treatment, such as washing the precipitate free of chloride ion, or, initially controlling the precipitation process to produce a low calcium, ammonium and chloride content $Zn(OH)_2$. Furthermore, the calcium chloride ($CaCl_2$) solution generated during filtration of the zinc hydroxide ($Zn(OH)_2$) can be recycled for stripping, washing and scrubbing in the various steps. The $Zn(OH)_2$ may be recovered at this stage, if desired, and processed in the form of a wet cake.

Step Seven: Drying

The zinc precipitate from Step 6 may be dried at temperatures between 50° C. and 250° C. into the form of a zinc concentrate ($Zn(OH)_2$, ZnO or $ZnCO_3$) for any one of a multitude of conventional applications. For example, after the filtering and washing step, the zinc hydroxide can be dried and calcined according to the following equation:

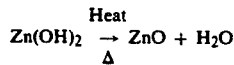

$$Zn(OH)_2 \xrightarrow[\Delta]{\text{Heat}} ZnO + H_2O$$

The following examples illustrate the preferred methods of the invention. These examples are illustrative only and do not limit the scope of the invention.

EXAMPLE 1—ZINC SX CIRCUIT

This example describes a prototype solvent extraction circuit of the present invention. This SX circuit is graphically depicted in FIGS. 1 and 2. The circuit design utilized 2-stage counter-current extraction (FIG. 2), 2-stage counter-current scrub, and single strip and wash stages. Each stage employed a double-walled glass mixer and settler. The mixers and settlers were capped and nitrogen sparged. Recycle from each settler to mixer was controlled by a pinch off valve and monitored by a rotameter. Individual stages were connected by glass tubing.

The outer chamber of each mixer and settler was used as a control jacket. Steam was applied to every vessel except the strip mixer. The strip mixer jacket was piped with water required for cooling.

The entire apparatus was mounted on a vertically positioned fiberglass grate inside a 30 ft by 8 ft trailer. A solution containment tray was placed beneath the entire apparatus for safety. The brine line was insulated ½ inch stainless steel pipe and the flow rate was regulated by adjusting a needle valve. Plant water was used to flush the line after each test series.

Reagents for the scrub, strip and wash stages were mixed in 20 or 50 liter plastic containers and administered by diaphragm metering pumps. The organic feed was pumped by gear pump from a metal insulated surge tank.

With reference to FIGS. 1 and 2, the cycle operates as follows. A side stream of brine was fed into the first extraction mixer (Zn EXTRACTION) where it contacted the immiscible organic phase. The emulsion advanced from the mixer to a settler where the phases were separated. The loaded organic phase containing the extracted zinc was then transferred to a scrub section (Fe, Mn SCRUB). The brine continued to the second extraction mixer where it was contacted with the recycled organic. The emulsion then advanced from the mixer to a settler where the phases were separated. The raffinate solution was discharged into a raffinate holding tank (RAFFINATE).

The loaded organic from the first extraction stage advanced to the first scrub mixer where it was first contacted with the scrub solution (sodium chloride and calcium chloride solution at a neutral pH). The scrub solution strips the undesired metals from the organic. The emulsion then moved from the mixer to a settler where the phases were separated. The organic phase was sent to the second scrub mixer where the final cleansing of the organic occurs. The second scrub stage emulsion then moved from the mixer to a settler where the phases were again separated and the organic was advanced to the strip stage.

The scrubbed organic was advanced from the second scrub settler to the mixer where it was contacted with a solution of 55 g/L ammonia and 50 g/L $CaCl_2$ (Zn STRIP). The ammonia solution stripped the zinc from the organic phase into the aqueous phase. The emulsion then advanced to a strip settler where the phases were disengaged. The organic moved on to the wash stage ($NH_3$ WASH), while the zinc laden strip solution was discharged from the circuit into a storage tank (Strip Solution/zinc concentrate).

The barren organic from the strip stage advanced to the wash mixer where it was contacted with the wash solution (55 gpl calcium chloride). The wash solution removed any entrained ammonia from the organic phase. The emulsion then moved from the mixer to a separater. The stripped organic phase advanced to the surge tank for recycle to zinc extraction. Prior to extraction of Zn, the recycled organic was treated with acid to lower its pH to 3.0.

EXAMPLE 2—CONTINUOUS SX PANEL RUNS

An SX panel, consisting of one extraction, two scrubs, one strip, and one acidification stage, was assembled for the continuous Zn SX runs using Aliquat 336 and actual geothermal brine. The analysis of the brine is shown in Table 1.

TABLE 1

Analysis of Geothermal Brine Sample HRI 44786
Sample Description
Some salt crystals and minor amount of tan-colored precipitate present in bottom of drums.

1. Quantitative assays
Assay, g/L

| Sample No. | pH | Sp.gr | Zn | Fe | Mn | Pb | Cl |
|---|---|---|---|---|---|---|---|
| HRI-44786 | 2.5 | 1.244 | .719 | 2.82 | 2.00 | .136 | 218 |

2. XRF semi-quantitative assays

| | g/L | | g/L |
|---|---|---|---|
| Cl | 214 | Cr | .02 |
| Na | 55 | V | .02 |
| Ca | 36 | W | .02 |
| K | 22 | U | .02 |
| Fe | 2.4 | Zr | .02 |
| Mn | 2.1 | Cu | .01 |
| Zn | .7 | Mo | .01 |
| Sr | .6 | Si | <.1 |
| Ba | .3 | Y | <.005 |
| Pb | .2 | Al | <.1 |
| Mg | .2 | S | <.2 |
| Rb | .1 | Ti | <.04 |
| Sn | .09 | P | <.05 |
| As | .04 | Co | <.005 |
| Th | .03 | Nb | <.005 |
| | | Ni | <.005 |

3. XRF semi-quantitative assay of crystallized salts present in bottom of drum.

| | % | | % |
|---|---|---|---|
| Cl | 56 | Cu | .002 |
| Na | 32 | Mo | .002 |
| Si | .1 | Y | .002 |
| Ba | .1 | Al | <.03 |
| Pb | .07 | S | <.05 |
| Ca | .03 | Fe | <.01 |
| K | .03 | Mg | <.05 |
| Sn | .02 | Ti | <.01 |
| Mn | .01 | P | <.05 |
| Cr | .007 | Co | <.001 |
| Th | .007 | Nb | <.001 |
| As | .005 | Ni | <.001 |
| V | .005 | Rb | <.001 |
| W | .005 | Zn | <.002 |
| Sr | .004 | | |
| U | .004 | | |
| Zr | .003 | | |

A. First Test Series

The conditions for these tests were as follows: The brine feed contained 0.71 g/L Zn, 2.7 g/L Fe, 2.1 g/L Mn; pH 2.5-3. The organic contained 10 vol% Aliquat 336+10 vol% Exxal 10 in Norpar 15. The scrub solution contained 5 g/L naCl+3 g/L caCl2, pH 2 (HCl). The strip solution contained 54 g/L $NH_3$+50 g/L $CaCl_2$. Acidification was performed using 3 N HCl feed solution, and 100 g/L NaCl/$NH_4$Cl solution recycle solution. The other conditions for the first set of four continuous SX runs and the assay results are summarized in Tables 2 through 4 below.

TABLE 2

Zn SX Data Summary

| | Extraction | Scrub | Strip | Acid'n |
|---|---|---|---|---|
| No. stages | 1 | 2 | 1 | 1 |
| Flowrate, ml/min | | | | |
| Organic | 110-130 | 110-130 | 110-130 | 110-130 |
| Feed aqueous | 400-450 | 12-15 | 7-9 | 0.3-0.5 |
| Mixer O/A ratio | 0.26 | 2 | 2 | 2 |
| Contact time, min | 0.15-.3 | 1 | 3 | 1 |
| Temperature, °C. | 90-95 | 75-85 | 60-80 | 70-80 |

TABLE 3

| Run No. | 5 | 6 | 7b | 8 |
|---|---|---|---|---|
| N2 blanket | extract'n only | extract'n only | extract'n acid'n | extract'n acid'n |
| SO2 add'n | scrub 1 + 2 and acid'n 30 cc/min | scrub 1 only 30 cc/min | scrub 1 only 10 cc/min | scrub 1 only 10 cc/min |
| Extract'n mixer | impeller | impeller | impeller | in-cline |
| Mix contact time | 16 sec | 15 sec | 15 sec | 9 sec |

TABLE 4

Zn SX Assay Data Summary

| Run | 5 | | 6 | | 7b | | 8 | |
|---|---|---|---|---|---|---|---|---|
| Assay, g/L | pH Zn | Fe | pH Zn | Fe | pH Zn | Fe | pH Zn | Fe |
| Extraction, | | | | | | | | |
| Organic | 1.88 | .53 | 1.96 | .54 | 2.07 | .51 | 2.0 | .5 |
| Raffinate | 2.5 .14 | | 2.7 .23 | | 2.5 .19 | | 3.2 .23 | |
| % extracted | 86.7 | | 67.6 | | 73.2 | | 68 | |
| Scrub 1, | | | | | | | | |
| Organic | 1.84 | .058 | 2.01 | .081 | 2.09 | .048 | | |
| Aqueous | .5 .038 | | .7 .064 | | .9 .062 | (5.5) | 1.3 .052 | |
| Scrub 2, | | | | | | | | |
| Organic | 1.86 | .01 | 1.88 | .012 | 1.97 | .009 | | |
| Aqueous | .7 .16 | | .8 .18 | | 1.0 .22 | | 1.4 .15 | |
| Strip, | | | | | | | | |
| Organic | 1.29 | .004 | .028 | .004 | 0.21 | .007 | | |
| Aqueous | 8.3 35.3 | | 34.7 | | 10.6 26.8 | | 9.7 26.2 | |
| Acid'n, | | | | | | | | |
| Organic | 1.33 | .007 | .17 | .005 | .15 | .005 | | |
| Aqueous | 2.0 .03 | | .026 | | .7 .006 | | 6.7 .006 | |
| Scum in extract'n | yes | | some | | trace | | trace | |
| Ppt in stripping | heavy | | yes | | yes | | slight | |
| Reagent addition | | | | | | | | |
| g HCl per L organic | | | | | 1.3 | | .87 | |
| g NH3 per L organic | | | | | 4.1 | | 3.1 | |

These data show 68 to 87% Zn extraction in 15 second contact time at 90° to 95° C. using impeller mixing. With in-line mixing and nine-second contact time, 68% Zn extraction was obtained. Iron and Mn co-extraction were 0.4 to 0.55 g/L. Only trace amounts of Cu and Pb were co-extracted. The organic loadings were (in g/l) 1.9 to 2.1 Zn, 0.5 Fe, and 0.35 Mn.

The loaded organic was scrubbed in two countercurrent stages with 5 g/l NaCl+3 g/l CaCl$_2$, pH 2 (HCl) solution plus some SO$_2$ injected into the mixer(s) at 75° to 85° C. Greater than 98 and 99% of the Fe and Mn, respectively, were scrubbed. Less than 1% of the Zn was scrubbed from the organic. The scrubbed organic assayed (in g/l) 1.9 to 2.0 Zn, 0.01 Fe, <.003 Mn, 0.007 Pb, and 0.001 Cu.

Contacting the scrubbed organic with 54 g/l NH$_3$ plus 50 g/l CaCl$_2$ for three minutes at 65° to 75° C. stripped 98+% of the Zn. The strip solution assayed (in g/l) 27 to 35 Zn, about 44 NH$_3$, 0.007 Cu, and <0.002 Fe, Mn, and Pb.

In the acidification stage, the stripped organic was neutralized with HCl before recycling. HCl required for neutralization ranged from 0.897 to 1.3 grams 100% HCl per liter organic or about 0.4 to 0.7 pounds 100% HCl per pound Zn. An estimated 50% of the acid required was due to the aqueous entrained in the organic.

Phase separation rates were rapid, less than 0.21 sq ft/gpm O+A in the extraction stage, and less than 0.7 sq ft/gpm O+A in the scrub, strip, and acidification stages.

In the last run (Run 8), no significant scum was formed in the extraction, scrub, and acidification stages. Some minor amount of precipitation (probably CaSO$_3$) occurred in stripping.

B. Second Test Series

Five Zn SX runs using in-line mixing in extraction were performed. A second geothermal brine sample was used in these tests and assayed (in g/l) 0.53 Zn, 1.25 Fe, 1.34 Mn, 0.12 Pb, 0.0010 Ag, and pH 3 to 3.5. Other information on the content of the brine is provided in Table 5.

TABLE 5

| Geothermal Brine Composition Average concentrations for production brines, injection brines may be 10-20 percent higher, balance is water. | | | |
|---|---|---|---|
| | | Trace Elements | (PPM) |
| Major Elements | (percent) | | |
| Chloride | 13.5 | Lead | 100 |
| Sodium | 6 | Rubidium | 100 |
| Calcium | 3 | Magnesium | 40 |
| Potassium | 1.5 | Arsenic | 15 |
| | | Cesium | 10 |
| Minor Elements | (PPM) | | |
| Carbon Dioxide | 2000 | Hydrogen Sulfide | 7 |
| Iron (Ferrous) | 1000 | Copper | 5 |
| Manganese | 930 | Methane | 3.0 |
| Strontium | 430 | Cadmium | 1.2 |
| Ammonia | 420 | Antimony | 0.9 |
| Lithium | 410 | Aluminum | 0.7 |
| Zinc | 370 | Silver | 0.4 |
| Boron | 330 | Chromium | 0.2 |
| Silicon | 250 | Tin | 0.2 |
| Barium | 13 | Selenium | 0.2 |
| | | Nickel | 0.2 |
| | | Bismuth | 0.07 |
| | | Beryllium | 0.02 |
| | | Radionuclides | — |
| | | Radium 226 | 0.080 pCi |
| | | Radon 222 | 0.810 pCi |
| | | Lead 210 | 0.064 pCi |
| | | Radium 228 | 0.064 pCi |
| | | Thorium 228 | — |

The effect of in-line mixing time on Zn extraction, a comparison of Zn extraction in one stage versus two countercurrent stages, and the effect of organic Zn loading on Zn extraction were screened in these runs.

The SX circuit was the same as used in previous runs except that the impeller-stirred mixer in the extraction stage was replaced by an in-line mixer. For the one stage extraction tests, the in-line mixer consisted of four 1.5-cm diameter×122 cm glass tubes filled with five- or six-millimeter glass beads and connected in series. For the two countercurrent stage tests, two of the tubes were used per stage with a settler between the first and second stage.

The conditions of this test were as follows. The brine feed assayed in g/L: 0.53 Zn, 1.25 Fe, and 1.34 Mn at a pH 3-3.5. The organic contained 10 vol% Aliquat 336+10 vol% Exxal 10 in Norpar 15, recycled from previous runs. The scrub solutions were: 1) 5 g/L NaCL +3 g/L CaCl2, acidified to pH 2 with HCl and 2) raffinate diluted 1/40 with H$_2$O and acidified to pH 2 with HCl. The strip solution was 55 g/L NH$_3$+50 g/L CaCl$_2$. The stripped organic wash solutions were 1) 3 N HCl feed solution, 100 g/L NaCl/NH$_4$Cl recycle solution, and 2) 50 g/L CaCl$_2$.

Other conditions are summarized in Table 6 below.

TABLE 6

| | No. of Stages | O/A ratio in mixer | Temp. °C. |
|---|---|---|---|
| Scrub | 2 | 2 | 80-90 |
| Strip | 1 | 2 | 75-85 |
| S. organic wash | 1 | 2 | 70-80 |

The test results are summarized in Table 7 below.

TABLE 7

| Run | 9a | 9b | 10a | 10b | 11 |
|---|---|---|---|---|---|
| Extract'n stages | 1 | 1 | 2 | 2 | 2 |
| Flowrate, ml/min | | | | | |
| Organic | 108 | 87 | 91 | 65 | 96 |
| Brine | 404 | 427 | 433 | 438 | 426 |
| Scrub feed, aq | 10 | 11 | 11 | 9 | 9 |
| Strip feed aq | 6.4 | 6.5 | 6.7 | 6.2 | 6.7 |
| Wash feed aq | 0.75 | 0.66 | 0.80 | 0.62 | 9.0 |
| Scrub sol'n | NaCl. CaCl2 | dil raff | dil raff | dil raff | dil raff |
| SO2 to scrub | yes | no | yes | yes | yes |
| S. organic wash sol'n | acidic NaCl | acidic NaCl | acidic NaCl | acidic NaCl | neutral CaCl2 |
| Strip temp. deg C | 80-85 | 80 | 80 | 75 | 75 |
| Extract'n time, sec | 25-50 | 25-50 | 25/stage | 26/stage | 25/stage |
| Raffinate, g/L Zn | .0845 | .115 | .030 | .088 | .022 |
| Zn extracted % | 83.5 | 79 | 94 | 84 | 96 |
| L. organic, | | | | | |
| g/L Zn | 1.66 | 1.89 | 2.31 | 2.67 | 2.31 |
| g/L Fe | 0.265 | 0.2 | 0.21 | 0.19 | 0.26 |
| Scrubbed org. g/L Fe | 0.006 | 0.013 | 0.039 | 0.037 | 0.046 |
| Fe scrubbed % | 98 | 94 | 81 | 81 | 82 |
| HCl added, g/g Zn | 0.51 | 0.44 | 0.42 | 0.39 | 0.09 |
| NH3 added, g/g Zn | 2.1 | 2.1 | 1.7 | 2.0 | 1.7 |

These test results show the following:

1. Zn Extraction

With one extraction stage, Zn extractions in 25- and 50-second contact time were the same (an average of 83.5%) with an organic loading of 1.7 g/l Zn (Run 9a). Increasing the organic loading, to 1.9 g/l Zn, decreased Zn extraction to approximately 79% (Run 9b).

With two countercurrent stages and 25-second contact time per stage, Zn extraction increased to about 95% with organic loadings of 2.3 g/l Zn (Runs 10a and 11). Increasing the organic loading, to 2.7 g/l Zn, decreased Zn extraction to 84% (Run 10b).

2. Fe Extraction and Scrub

Fe loadings on the organics ranged from 0.18 to 0.28 g/l. Scrubbing with 5 g/l NaCl+3 g/l $CaCl_2$ (pH 2) solution appears to be more effective in removing Fe from the loaded organic (98%, Run 9a) than diluted, pH 2 raffinate (81%, Run 10a). About 0.5% of the extracted Zn reported in the spent scrub solution (Run 11). $SO_2$ appears to be helpful in scrubbing, in that less Fe precipitation occurred when $SO_2$ was used. There was no precipitation when the spent scrub solution from Run 11 was added to the extraction raffinate.

3. Stripping

Greater than 99% Zn stripping was achieved at 75° to 80° C. with 55 g/l $NH_3$+50 g/l $CaCl_2$ solution. The strip solution boiled at 85° C.

Pregnant strip solution assays were 27 to 28 g/l Zn and 40 to 45 g/l $NH_3$ (ratio $NH_3$/Zn=1.6).

$NH_3$ addition averaged 1.8 pounds $NH_3$ per pound Zn extracted (Runs 10a, 10b, 11).

Residual Fe left in the scrubbed organic reported in the strip solution as a rust-colored gelatinous precipitate which did not filter well. About 0.05 grams dry precipitate solids were formed per liter feed brine. Run 10+11 precipitate assayed 12% Zn, 22% Fe, 7.1% Ca, 2.5% Pb, and <0.05 oz/ton Ag. The precipitate contained 1.2% of the total Zn fed to SX.

4. HCl Consumption

HCl required to neutralize the stripped organic decreased from 0.4 to 0.09 pound HCl per pound Zn extracted when the stripped organic was washed with neutral 50 g/l $CaCl_2$ solution before recycle to extraction (Run 10a versus Run 11). In Run 11, HCl was added to the brine feed to maintain the raffinate at pH 3.0 to 3.4.

5. SX Run 11

The best overall results were obtained in Run 11. Conditions and results for this run are given in Tables 8-10 respectively.

The SX circuit of the present invention wa performed under the following conditions reported below and in Table 8. For the in-line mixer, each stage consisted of two 1.5 cm diameter ×122 cm glass tubes filled with 5 or 6 mm glass beads, steam jacketed. Total void space was 216 cc per stage. O/A flow was an upflow through the in-line mixer. The feed solutions included the organic: 10 vol% Aliquat 336 and 10 vol % Exxal 10 in Norpar 15. The feed brine (sample 45235) was treated with 25 g Fe/150 L brine, and kept under nitrogen. Brine was passed through a filter containing Fe powder, then hot through a column of Fe wool. The pH adjustment was made with about 10 g/L HCl added to the brine to maintain a raffinate pH of 3.0-3.4. The scrub solution was raffinate diluted with water, adjusted to pH 2 with HCl. The strip solution was 55 g/L $NH_3$ and 50 g/L $CaCl_2$. The Stripped organic wash solution was 50 g/L $CaCl_2$. $SO_2$ was added by sparging 10–15 cc/minute gaseous $SO_2$ into scrub 1 mixer.

TABLE 8

|  | Extraction | Scrub | Strip | Stripped Organic Wash |
|---|---|---|---|---|
| Run time, min. | 345 | | | |
| No. stages | 2 | 2 | 1 | 1 |
| Org. vol., L | 33.0 | 33.0 | 33.0 | 33.0 |
| Feed Aq vol, L | 147 | 3.0 | 2.32 | 3.13 |
| HCl vol, L | .655 | | | |
| Flowrate, ml/min | | | | |
| Organic | 96 | 96 | 96 | 96 |
| Aq feed | 426 | 8.7 | 6.72 | 9.07 |
| Aq recycle | 0 | 39 | 41 | 39 |
| Total | 522 | 143 | 143 | 143 |
| Mixer vol, ml | 216 | 140 | 450 | 140 |
| Settler vol, ml | 1000 | 1000 | 1000 | 1000 |
| diam., cm | 6.1 | 6.1 | 6.1 | 6.1 |
| area, sqft | .031 | .031 | .031 | .031 |
| Mix time, min | .41 | 1.0 | 3.1 | 1.0 |
| Settling | | | | |
| Time, min (O + A) | 1.9 | 7.0 | 7.0 | 7.0 |
| Rate, sqft/gpm (O + A) | .23 | .83 | .83 | .83 |
| Temp, deg. C | 86–96 | 79–88 | 75 | 70 |
| pH | 3.0–3.4 | 1.9 | 9.9 | 9.9 |
| Scum formed | slight | slight | | |

The following reagent addition occurred before assays were performed for the amounts of minerals and reagents at various stages (reported in Table 9 below): HCl in pH adjustment: 19.8 ml 0.27N HCl/L organic or 0.20 g 100% HCl/L organic; $NH_3$ in stripping: 70.3 ml 55 g/L $NH_3$/L organic or 3.8 g 100% $NH_3$/L organic.

TABLE 9

| Assays | pH | Zn | Fe | Mn | $NH_3$ | Ca | Ag | Pb |
|---|---|---|---|---|---|---|---|---|
| Brine feed | 3.2 | .500 | 1.36 | (1.34) | | | .0010 | .120 |
| Profile samples, end of run | | | | | | | | |
| Extr'n, barren stg | | | | | | | | |
| Organic | | .76 | .54 | | | | | |
| Raff. | 3.1 | .022 | 1.28 | | | | .0007 | .117 |
| Extr'n, preg stg | | | | | | | | |
| Organic | | 2.31 | .26 | | | | | |
| Raff. | 2.6 | .18 | | | | | | |

TABLE 9-continued

| Assays | pH | Zn | Fe | Mn | NH3 | Ca | Ag | Pb |
|---|---|---|---|---|---|---|---|---|
| Scrub, stg 1 | | | | | | | | |
| Organic | | 2.32 | .052 | | | | | |
| Aq | 1.8 | .089 | 3.81 | | | | <.0005 | .021 |
| Scrub, stg 2 | | | | | | | | |
| Organic | | 2.29 | 0.46 | | | | | |
| Aq | 1.9 | .25 | .32 | | | | <.0005 | .028 |
| Strip | | | | | | | | |
| Organic | | .015 | .023 | | | | | |
| Aq | 9.9 | 28.5 | | | 40.4 | | <.0005 | .002 |
| S. org wash | | | | | | | | |
| Organic | | .003 | .004 | | | | | |
| Aq | 9.9 | .41 | | | 3.7 | | <.0005 | .002 |
| Composites | | | | | | | | |
| Raff. | 3.2 | 0.25 | | | | | | |
| Scrub soln | 1.4 | .13 | | | | | | |
| Strip soln | 10.0 | 29.4 | | | 44.3 | | | |
| S. org wash | 8.8 | .57 | | | 4.9 | | | |
| Strip solids (2 runs; 14.7 g) | | 12.0 | 22.3 | | | 7.07 | <.05 gpt | 2.45 |

The amount of zinc recovered at each stage is reported in Table 10 below.

TABLE 10

| | Amount | Zn Assay | g Zn | Zn Dist. % |
|---|---|---|---|---|
| Feed brine | 147 L | .500 g/L | 73.5 | |
| Strip soln | 2.32 L | 29.4 g/L | 68.2 | 93.2 |
| Raffinate | 147 L | .025 g/L | 3.7 | 5.0 |
| Scrub soln | 3.00 L | .13 g/L | .4 | .5 |
| Strip ppt | 7.4 g | 12% | .9 | 1.2 |
| | | | 73.2 | 100 |

Each stage consisted of two 1.5 cm diameter glass tubes (122 cm) filled with 5 or 6 mm glass beads which are steam jacketed. The total void space is 216 cc per stage upflow through the in-line mixer. Run time was about 345 minutes.

The scrub solution was made up of raffinate from a previous run diluted 1/40 with H2O, and the pH adjusted to 2 with HCl. The strip solution was 55 g/L NH3 and 50 g/L CaCl2. The strip organic wash solution was 50 g/L CaCl2. Between 10–15 cc/min. of gaseous SO2 was sparged into the scrub 1 mixer.

The feed brine from a continuous panel SX test was assayed and found to contain 1 mg/L Ag and less than 0.5 mg/L Ag (reported in the strip solution). This corresponds to a Ag/Zn ratio = <0.0005/29. A trace amount of Pb (2 mg/L Pb) was found in the Zn strip solution. Most of the Pb (extracted and entrained) appears to have been scrubbed from the organic and precipitated with the Fe during stripping.

The following data are of particular interest. The zinc extracted in two countercurrent stages was 95.6%; feed and raffinate assays were 0.50 and 0.022 g/l Zn, respectively. The loaded organic assayed 2.31 g/l Zn and 0.26 g/l Fe. After two countercurrent scrub stages with diluted pH 2 raffinate, the scrubbed organic assayed 2.29 g/l Zn and 0.046 g/l Fe. Eighty-two percent of the Fe and 0.5% of the Zn were scrubbed from the organic. About 0.4 liter SO2 per liter organic was injected into the first scrub mixer to maintain reducing conditions during the scrub. In one stripping stage with 55 g/l NH3 plus 50 CaCl2 solution at 75° C., 99+% Zn stripping was achieved producing a pregnant strip containing (in g/l) 28.5 Zn, 40.4 NH3 (total), 0.002 Pb, <0.0005 Ag, and pH 9.9. NH3 added in stripping was 3.8 grams 100% NH3, per liter organic or 1.65 grams per gram Zn stripped.

The residual Fe in the scrubbed organic formed a gelatinous Fe hydrate precipitate in the strip solution. This precipitate did not cause any apparent phase separation problem. Washing the stripped organic with 50 g/l CaCl2 solution removed the entrained NH3 from the organic. The amount of HCl added to the feed brine to maintain pH 3 in extraction was 0.20 grams 100% HCl per liter organic or 0.087 grams 100% HCl per gram Zn extracted. The feed brine assayed 1 mg/L Ag and less than 0.5 mg/L Ag reported in the strip solution. A trace amount of lead (2 mg/L Pb) was reported in the strip solution. Most of the Pb appears to have been scrubbed from the organic and the rest precipitated with the residual Fe during stripping. The Fe precipitate assayed 2.5% Pb, equivalent to about 5 mg/L Pb in the scrubbed organic.

6. Organic Stability

Infrared scans of Run 8 and 11 organics and fresh organic were the same, indicating that no significant change in chemical composition occurred in about ten organic cycles.

7. Organic Solubility

Soluble amine, Exxal 10, and Norpar 15 were determined by the freon extraction-chromatographic method in the aqueous samples from Run 11 as shown in Table 11.

TABLE 11

| | Assay, mg/L | | |
|---|---|---|---|
| Sample | Amine | Exxal 10 | Norpar 15 |
| Raffinate | <0.2 | <0.1 | <0.2 |
| Fe scrub solution | 18 | 0.7 | <0.2 |
| Strip solution | 41 | 3.0 | <0.2 |
| Organic wash solution | 41 | 3.7 | <0.2 |

EXAMPLE 3—ZINC AND AMMONIA RECOVERY FROM SX RUN

Zinc hydroxide was precipitated and NH$_3$ released from Run 11 strip solution by heating with Ca(OH)$_2$. Test conditions and results are given in Table 12 below.

Strip solution (500 mL) was taken from the settler in the run described in the above example. Zinc was precipitated from the strip solution from the example above by heating at 70° -90° C. for 1.5 hr with 1.33 g reagent grade (95%) Ca(OH)$_2$ powder per gram Zn. The solid-liquid (S/L) separation was performed by filtering the solution through an 11 cm Whatman #1 paper at 12° C. in a vacuum and washing the precipitate with H$_2$O. The precipitate is then dried at 55° C.

The reaction was as follows:

$$Zn(NH_3)_4Cl_2 + Ca(OH)_2 \rightarrow Zn(OH)_2 + CaCl_2 + 4 NH_3 \uparrow$$

The results of two tests run as described above are provided in Tables 12 and 13 below.

TABLE 12

| | | Test 1 | | | | | | |
|---|---|---|---|---|---|---|---|---|
| | | | Assay, g/L or % | | | | Amt, g | |
| Sample | Amt | pH | Zn | NH$_3$ | Ca | Cl | Zn | NH$_3$ |
| Strip soln | 500 mL | 9.9 | 29.4 | 43.2 | | | 14.7 | 21.6 |
| Ca(OH)$_2$ added | 533 g 17.7 g | | | | | | | |
| Slurry | 410 g | | | | | | | |
| PF | 330 mL | 9.8 | 3.54 | 7.5 | | | 1.8 | 2.5 |
| W | 195 mL | | | | | | | |
| Ppt, moist | 43.7 g | | | | | | | |
| dry | 17.9 g | | 73.3 | <.01 | 1.02 | | 13.1 | |
| Zn ppt | | | 13.1 g | | | | 88.1% | |
| NH$_3$ evolved | | | 18.6 g | | | | 86.2% | |
| Evaporated, total H$_2$O | | | 141 g 122 g, 9.3 g/g | | | | Zn ppt'd | |

TABLE 13

| | | Test 2 | | | | | | |
|---|---|---|---|---|---|---|---|---|
| | | | Assay, g/L or % | | | | Amt, g | |
| Sample | Amt | pH | Zn | NH$_3$ | Ca | Cl | Zn | NH$_3$ |
| Strip soln | 500 mL | 9.9 | 29.4 | 43.2 | | 21.6 | 14.7 | 21.6 |
| Ca(OH)$_2$ added | 530 g 19.5 g | | | | | | | |
| Slurry | 386 g | | | | | | | |
| PF | 265 mL | 9.9 | .30 .08 | 2.2 | 61 | .58 | .08 .02 | .58 .16 |
| W | 195 mL | | | | | | | |
| Ppt, dry | 19.6 g | | 72.5 | .04 | 1.22 | | 14.2 14.3 | .008 .75 |
| Zn ppt | | | 14.2 g | | | | 99.3% | |
| NH$_3$ evolved | | | 20.9 g | | | | 96.5% | |
| Evaporated, total H$_2$O | | | 164 g 143 g, | | | | 10 g/g Zn ppt'd | |

The filter (formation) rate of the precipitate from test 2 was 26 lb dry solids/hr/sq.ft. A quantitative analysis of this precipitate 2 revealed the following:

| | |
|---|---|
| Zn | 72.5% |
| NH$_3$ | .04% |
| Ca | 1.22% |
| Ag | 0.05 oz/ton |

In the above tests, about 99% of the Zn was precipitated, 97% of the NH$_3$ was released and 10 lb of water was evaporated per lb Zn precipitated.

The following information in this data is significant. Heating the strip solution from 40° to 90° C. with 1.1×stoichiometric Ca(OH)$_2$ (1.24 pound 100% Ca(OH)$_2$ per pound Zn) precipitated 99.3% of the Zn and released 96.5% of the NH$_3$. The precipitate, identified by x-ray diffraction as zincite (Zn), assayed 72.5% Zn, 0.04% NH$_3$, 1.2% Ca, 0.35% Cl, 0.6% Mg, 0.2% SiO$_2$, <0.05 oz/ton Ag, and <0.02% Pb.

EXAMPLE 4—REMOVAL OF Fe AND Mn FROM GEOTHERMAL BRINES BY SCRUBBING

Shakeout tests using actual geothermal brine samples showed Fe and Mn are co-extracted with Zn. Various methods of minimizing their extraction were tested.

A. Zn Extraction

A zinc extraction was performed using a geothermal brine (GTB) sample containing the following elements, at pH 4.3:

| | g/L |
|---|---|
| Zn | .73 |
| Fe, total | 2.59 |
| Fe$^{+3}$ | <.01 |
| Mn | .24 |
| Pb | .13 |
| Si | 224 |
| Cl | 0.04 |

An organic containing 10% v/v Aliquat 336 and 10% v/v Exxal 10 in Norpar 15 which had been conditioned through one extraction, strip and scrub cycle was assayed.

This GTB was contacted with the organic in a resin kettle (RK) or a sealed bottle (Btl) under N$_2$ at a temperature of 88°-92° C. The A/O ratio was 3.3-3.5/1. The results of these tests are shown in Table 14 and illustrate that Zn powder reduced Fe in the organic phase.

TABLE 14

| Test | 1 | 2 | 3 | 4 | 5 |
|---|---|---|---|---|---|
| GTB pretreatment with | none | NaHS powder | Zn coarse | Zn powder | Fe |
| Contacted in | RK | RK | Btl | Btl | Btl |
| Time, min. | 2 | 3 | 2 | 0.5 | 0.5 |
| Organic, g/L | | | | | |
| Zn | 2.14 | 1.95 | 2.33 | 2.80 | 2.07 |
| Fe | 0.49 | 0.51 | 0.56 | 0.25 | 0.40 |
| Mn | 0.27 | 0.17 | | | |
| Raffinate, g/L | | | | | |
| Zn | 0.11 | | | | |
| pH | 3.0 | 4.0 | 2.8 | 3.5 | 3.6 |

Both Fe and Mn are partially co-extracted with Zn from untreated geothermal brine by Aliquat 336. Pretreating the brine with NaHS and Zn or Fe powder to make certain all the Fe was reduced to Fe$^{+2}$ did not significantly decrease Fe extraction.

B. Fe and Mn scrub from organic

Fe and Mn scrub tests using dilute HCl, NaCl, and CaCl$_2$ solutions are summarized in Tables 15 and 16 below. A dilute chloride solution containing (in g/l) 5 NaCl, 2 CaCl$_2$, and 0.2 HCl selectively scrubbed Fe and Mn from Zn-loaded Aliquat 336 organic.

The feed organic was made up of 10% v/v Aliquat 336 and 10% v/v Exxal 10 in Norpar 15, and was contacted with geothermal brine. An X-ray fluorescence assay revealed a composition of 2.02 g/L Zn, 0.42 g/L Fe, and 0.27 g/L Mn. The scrub solutions were prepared from reagent grade NaCl, CaCl$_2$ and HCl. Contact was made in sealed 8 oz. bottles for 5 min. at a temperature of between 85°–89° C. The A/O ratio was 1.2/1.

These results illustrate that without salt concentrations or reasonable amounts of acid, emulsification occurs.

TABLE 15

| Test | 1 | 2 | 3 | 4 |
|---|---|---|---|---|
| Scrub soln | | | | |
| HCl, g/L | 3.7 | .37 | .37 | .22 |
| NaCl, g/L | 0 | 100 | 0 | 5.0 |
| CaCl$_2$, g/L | 0 | 40 | 0 | 2.0 |
| Phase break | OK | OK | emulsion | OK |
| Organic | clear | clear | formed | clear |
| Aqueous | clear | clear | | slt. cldy |
| Scum | no | no | | no |
| Assays, g/L | | | | |
| S. organic, | | | | |
| Fe | .17 | .37 | | .05 |
| Zn | 1.76 | 2.01 | | 1.80 |
| Mn | | | | <0.3 |
| S. soln, | | | | |
| Fe | .27 | .030 | | .5 |
| Zn | .39 | .029 | | .2 |
| Mn | | | | .3 |
| % scrubbed, | | | | |
| Fe | 56 | 11 | | 82 |
| Zn | 16 | 1 | | 8 |
| Mn | | | | >88 |
| Dist. coefficient K A/O, | | | | |
| Fe | 1.6 | .1 | | 10 |
| Zn | .22 | .01 | | .11 |
| Mn | | | | >10 |
| Separation factor Fe/Zn | 7 | 6 | | 90 |

TABLE 16

Fe and Mn Scrubbing with Dilute Acidified NaCl + CaCl2 Solution

| | |
|---|---|
| Organic | 10 vol % Aliquat 336 + 10 vol % Exxal 10 in Norpar 15. Loaded by contacting with Geothermal brine to (in g/L) 2.09 Zn, .72 Fe, .37 Mn |
| Scrub soln | 5.0 g/L NaCl + 2.0 g/L CaCl$_2$, pH 2.0 w/HCl |
| Contact Time | 2 min |
| O/A ratio | 2/1 |
| Temperature | 85–90° C. |
| Method | Scrub soln contacted three times with fresh portions of loaded organic. |

| | | Assay, g/L | | | Dist. Coeff. K a/o- | | | Sep'n Factor | |
|---|---|---|---|---|---|---|---|---|---|
| Contact Sample | | Fe | Mn | Zn | Fe | Mn | Zn | Fe/Zn | Mn/Zn |
| | Loaded organic | .72 | .37 | 2.09 | | | | | |
| 1 | Scrub soln | 1.03 | .82 | .15 | 5.15 | 410 | .077 | 67 | 5330 |
| | Scrubbed organic | .20 | .002 | 1.95 | | | | | |
| 2 | Scrub soln | 1.97 | 1.98 | .12 | 7.04 | 990 | .057 | 124 | 17408 |
| | Scrubbed organic | .28 | .002 | 2.11 | | | | | |
| 3 | Scrub soln | 2.83 | 2.86 | .12 | 9.76 | 953 | .057 | 170 | 16604 |
| | Scrubbed organic | .29 | .003 | 2.09 | | | | | |

EXAMPLE 5—Zn PRECIPITATION AND NH$_3$ RECOVERY FROM SYNTHETIC STRIP SOLUTION BY LIME BOIL

A synthetic strip solution was prepared by dissolving 37.6 g ZnCl$_2$ and 107 g CaCl$_2$.2H$_2$O in H$_2$O, to a volume of 484 mL. While mixing, 114 mL of 14 5 N NH$_4$OH was added. The solution contains 30.4 g/L Zn, 46.6 g/L NH$_3$, and 135 g/L CaCl$_2$.

The first evaporation was performed at a temperature of between 30° to 74° C., at a pH of 11–12, over a period of 2 hours. The slurry weight was 476.1 g and the weight loss was 110 g. The second evaporation was performed on 459.3 g of slurry feed from the first evaporation. The evaporation was performed at a temperature of between 70°–80° C. over a period of 1 hour. The slurry weight was 398.4 g and the weight loss was 60.9 g.

The results of this analysis are illustrated in Tables 17 and 18, and illustrate that the lime boil step of the process allows recovery of ammonia for recycling.

TABLE 17

| | | | Assay, % or g/L | | | Amt, g | |
|---|---|---|---|---|---|---|---|
| Sample | mL | g | Zn | NH$_3$ eq. | Ca | Cl | Zn | NH$_3$ eq. |
| Syn. strip soln | 500 | 567.1 | 30.4 | 46.6 | | | 15.2 | 23.3 |
| Ca(OH)$_2$ | | 18.6 | | | | | | |
| First sample | | 16.8 | | | | | | |
| Soln | 15 | | 4.4 | 10.4 | | | 1.8 | 4.2 |
| Final sample | | | | | | | | |
| Soln | 320 | | 0.68 | 2.6 | | | .22 | .83 |
| Ppt, moist | | 130 | | | | | | |
| dry (80° C.) | | 24.1 | 51.7 | | 7.81 | 17 | 12.4 | |

TABLE 18

| | First evaporation | First evaporation |
|---|---|---|
| Zn, ppt'd, g | 13.4 | 15.0 |
| % | 88.2 | 98.5 |
| g evaporated | | |
| NH$_3$ | 19 | 20 |
| H$_2$O | 91 | 172 |
| H$_2$O evaporated | 6.8 | 12 |

TABLE 18-continued

| | First evaporation | First evaporation |
|---|---|---|
| g/g Zn ppt'd | | |

EXAMPLE 6—VARYING THE AQUEOUS TO ORGANIC RATIO

A series of solvent extractions were conducted at several power plants to optimize the Zn extraction step of the SX circuit of this invention. An exemplary analysis of the aqueous to organic ratio (A/O) by volume percent for Zn extraction at one plant is shown in Table 19 below.

TABLE 19

Zinc Solvent Extraction Summary of Results

| Test No. | A/O Ratio | % Zinc Extraction |
|---|---|---|
| 1 | 3.3 | 94.0 |
| 2 | 3.7 | 93.8 |
| 3 | 3.5 | 93.6 |
| 4 | 3.7 | 89.3 |
| 5 | 2.5 | NA* |
| 6 | 3.7 | NA* |
| 7 | 5.9 | 65.9 |
| 8 | 4.5 | 84.2 |
| 9 | 2.6 | 94.6 |
| 10 | 3.89 | 90.2 |

*Note: Not Available

Other power plants showed similar relationships between A/O ratios and % Zn extraction.

EXAMPLE 7—Zn STRIP ASSAY FROM ALIQUAT 336 WITH NH₄Cl

The following example illustrates that the methods of the prior art, e.g., extraction with NH$_4$Cl and acid does not successfully strip Zn from the brine.

The feed organic was made up of 10% v/v Aliquat 336 ad 10% v/v Exxal 10 in Norpar 15, 2.16 g/L Zn. A strip solution of varying amounts of NH$_4$Cl in 0.1 N HCl was used. Contact was made in a baffled beaker at a temperature of 80°-85° C. for five minutes. The O/A ratio was 2/1. The test results are illustrated in Table 20 below.

TABLE 20

| Test | Strip soln g/L NH$_4$Cl | Sample | pH | Zn g/L | % Zn stripped |
|---|---|---|---|---|---|
| | | Feed organic | | 2.16 | |
| 1 | 50 | S. organic | | 2.06 | |
| | | S. soln | 1.9 | .054 | 1.2 |
| 2 | 250 | S. organic | | 1.92 | |
| | | S. soln | 1.4 | .14 | 3.2 |
| 3 | 400 | S. organic | | 1.90 | |
| | | S. soln | 1.9 | .24 | 5.6 |

EXAMPLE 8—Na₂SO₄ STRIP IS NOT DESIRABLE

Tests were conducted to determine if an Na$_2$SO$_4$ Zn strip solution would be preferable to the ammoniacal CaCl$_2$ solution used in this invention.

These experiments included 3 stages of extraction and the same number of stages for stripping and regeneration (locked cycle). All the contact times were maintained at 5 minutes for extraction, stripping and regeneration. Settling times were set at 15 minutes. The aqueous to organic ratios varied according to the objective of the test. The reagents used for extraction, stripping and regeneration were: Adogen-464 (10 percent by volume), sodium sulfate, and sodium chloride, each at 10 percent weight solution.

In order to evaluate the extraction kinetics for extraction, agitated solvent extraction tests were conducted at 2 and 5 minutes contact time. Zinc recovered was calculated by difference between the feed and raffinate solutions.

Most of the solvent extraction experiments were performed using a quaternary ammonium compound as the extractant, (Adogen 464). Only one other extractant was tested, a secondary amine, Amberlite LA-2 made by Rohm & Haas. The test conditions were similar to those used with the Adogen 464 extractant with the appropriate amounts of modifier (10 volume percent) and diluent (80 volume percent).

In some cases the stripped organic had to be regenerated with a sodium chloride or hydrochloric acid solution to avoid transfer to sulfate or hydroxide ions into the extraction stage.

An important aspect for extraction of zinc with a quaternary ammonium compound was the evaluation of various reagents for stripping. A list of the stripping agents tested is provided below:

| Stripping Solution | Regenerating Solution |
|---|---|
| 1. Sodium Sulfate (10% WT) | Sodium Chloride (10% WT) |
| 2. Ammonium Chloride/Ammonia (1.5 M) (5% WT) | Hydrochloric Acid |
| 3. Distilled Water | |
| 4. Concentrated Hydrochloric Acid | Sodium Chloride |
| 5. Hydrochloric Acid (18% WT) | |
| 6. Sodium Sulfate/Ammonia | Sodium Chloride |

The solvent extraction experiments conducted to evaluate the performance of the reagents for stripping, were designed to increase the zinc concentrations in the strip solution. In order to accomplish an increase in zinc concentration in the strip solution, the organic was contacted with fresh brine at a volume phase ratio of 4.1 parts of aqueous to 1 part of organic in three different stages. Each extraction stage was followed by locked cycle stripping at a volume phase ratio of 1.25 parts of strip solution to 1 part of organic. The regeneration stage (when necessary) was conducted at a volume phase ratio of 2.5 parts of regeneration solution to 1 part of organic.

Extraction of zinc was conducted under strong agitation and temperatures of approximately 80 degrees Celsius for contact times ranging from 1 to 5 minutes. Stripping and regeneration stages were conducted at ambient temperature with contact times ranging from 1 to 5 minutes. The settling times allowed for phase separation ranged from 3 to 15 minutes.

The following parameters were specific for each extraction, stripping, and regeneration stage:

| Conditions | Solvent Extraction Stage | | |
|---|---|---|---|
| | Extraction | Stripping | Regeneration |
| A/O Ratio: | 3/1 | 2.5/1 | 2.5/1 |
| Contact Time | 5 minutes | 5 minutes | 5 minutes |
| Settling Time | 15 minutes | 15 minutes | 15 minutes |

The temperature was maintained at 85 to 90 degrees Celsium during extraction. The pH of the reduced brine was adjusted to 3.5 to 4.0. The extractant contained 10 volume percent of a quaternary ammonium compound, 10 volume percent of decyl alcohol as modifier and 80 volume percent of diluent Norpar 15 made by Exxon. The reagents used for stripping and regeneration were 10 percent solutions by weight of sodium sulfate and sodium chloride respectively.

Regeneration of the organic is deemed necessary to prevent sulfate transport into the brine. In this experiment, zinc extractions were fairly high at approximately 84 to 87 percent.

In an attempt to build-up the strip solution zinc concentration, the aqueous to organic ratio was changed to 1.25 to 1 for stripping. Each extraction cycle was followed by locked cycle stripping and regeneration. A total of 3 cycles per test were conducted in each experiment for strip reagent evaluation. The following Table 21 summarizes the results obtained in the stripping reagents evaluation.

TABLE 21

Summary of Results Stripping Reagents Evaluation

| Stripping Reagent | Strip Solution Zn Analyses (gram/liter) | Percent Zn Stripped |
|---|---|---|
| Sodium sulfate (10% WT) | 3.16 | 37.27[1] |
| 1.5 M NH$_4$Cl 1.5 M NH$_3$ | 3.08 | 39.72[2] |
| Hydrochloric Acid (37% WT) | 2.28 | 58.81[3] |
| Hydrochloric Acid (18% WT) | 0.50 | 6.52[4] |
| Water (Distilled) | N/A | N/A[5] |
| 1.5 M Na$_2$SO$_4$ 1.5 M NH$_3$ | 10.72 | N/A[6] |

[1] Stripping efficiency drops due to chloride transfer.
[2] Hydroxyl is loaded during stripping.
[3] Third phase occurred.
[4] Not effective.
[5] Formed emulsions at O/A ratios of 5 or lower.
[6] A metal balance was not conducted in this test. The main objective was to build-up the zinc concentration in the strip solution.

The results tabulated above indicate that none of the reagents tested was particularly effective for stripping zinc. The maximum zinc concentration achieved was approximately 3 grams per liter. A higher strip liquor concentration was achieved with a sodium sulfate/ammonia solution of 10.7 gram per liter zinc but the efficiency of stripping was low; i.e. multistage contacts would be required.

Transfer of chloride into the strip solution lowered the efficiency for stripping in most cases. A low efficiency in stripping affected significantly the zinc extraction efficiency by lowering the capacity of the extractant. Maximum loading for the organic was determined to be approximately 4.8 gram per liter zinc at brine levels of about 700 ppm $Zn^{+2}$. The efficiency in the extraction stage decreased as the strip efficiency also decreased in locked cycle stripping. After 3 cycles of extraction, stripping and regeneration, organic residual loadings as high as 2.9 gram per liter zinc were observed following stripping stage. Maximum stripping liquor loads of only 3.2 gpl were in equilibrium with the organic phase. The zinc recoveries observed in the tests conducted were in the 60 to 70 percent range with an organic that had been through at least one cycle of extraction, stripping and regeneration. Higher extractions were achieved in the first cycle when barren organic was used. Stripping with ammonium chloride/ammonia formed emulsions and phase disengagement was slow. These emulsions were caused mainly by pre- cipitation of iron hydroxides. Emulsification may not occur if iron is not co-extracted with zinc (this led to the iron scrub ammonia extraction invention).

Ammonium chloride/ammonia 1.5 M solution proved to be effective as a stripping reagent at full strength. The efficiency in stripping decreases with chloride and zinc transfer. Titration of the organic after ammonium chloride-ammonia strip indicated that the organic contained up to 4.4 gram per liter hydroxyl ion. This base would have to be neutralized prior to sending the organic to extraction or regeneration stages. If organic is not regenerated after ammonia strip, precipitation of iron will occur during the extraction stage (this led to the water wash portion of the invention).

Stripping with concentrated hydrochloric acid caused third phase formation. In order to avoid third phase, 18 percent weight hydrochloric acid was used. At this concentration, the reagent is no longer effective as a stripping agent. A washing stage (with NaCl) was needed to strip the acid loaded onto the organic prior to subsequent zinc extraction.

Stripping with water was effective only at a volume phase ratio of 10 to 20 parts of organic to 1 part of aqueous. The zinc concentration of the strip solution at both 10 and 20 organic to aqueous ratios, after 1 cycle was 2.1 gram per liter zinc. Good phase separation was obtained only at low aqueous to organic ratios but an increase in zinc concentration was not obtained. The lower loading results may be skewed by the kinetics of $Zn^{+2}$ transfer being limited at such low aqueous ratios. There were no indications of sulfate transport into the raffinate after zinc extraction. The brine fed into the system as well as the products obtained from the solvent extraction circuit all showed concentrations of less than 0.005 gram per liter sulfate. However, chloride transfer to the sodium sulfate salt makes its use not economically feasible.

Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. An improved method of extracting zinc from an aqueous brine containing a mixture of salts and other elements including Zn, Fe and Mn, wherein the method comprises the steps of (1) contacting the aqueous brine with a selected organic extractant to remove Zn from the brine, producing an organic extractant loaded with Zn; (2) scrubbing the loaded organic extractant with a dilute acidified brine to remove co-extracted Fe and Mn from the loaded organic extractant, producing a scrubbed organic extractant containing Zn; and (3) stripping the Zn from the scrubbed organic extractant with a solution of ammonia and a suitable salt to produce a stripped organic layer and a concentrated and purified aqueous Zn strip solution having a Zn concentration of at least 10 g/L, the improvement comprising the steps of:

(4) reacting the aqueous Zn strip solution of step (3) with a base or precipitant at elevated temperatures to precipitate the Zn from the strip solution as $Zn(OH)_2$ or $ZnCO_3$ and release ammonia for recycle to step (3); (5) washing the stripped organic layer of step (3) with neutral salt solution to remove ammonia from the organic layer; and optionally acidifying and recycling the organic layer to step (1); (6) filtering and recovering the $Zn(OH)_2$ or $ZnCO_3$ from step (4) and recycling the salt-washed stripped organic layer solution back to step (3).

2. The method according to claim 1 further comprising the step of drying the zinc hydroxide, wherein ZnO is recovered.

3. The method according to claim 1 which occurs in a closed system from which oxygen is excluded.

4. The method according to claim 1 wherein the organic comprises a quaternary amine.

5. The method according to claim 4 wherein the quaternary amine contains a long-chain alkyl group.

6. The method according to claim 5 wherein said amine contains at least three said long-chain alkyl groups and one methyl group.

7. The method according to claim 6 wherein the organic further comprises a modifier and a diluent.

8. The method according to claim 7 wherein the modifier is a long-chain alkyl alcohol and the diluent is a low-vapor pressure, low-viscosity mineral oil.

9. The method according to claim 1 wherein the organic extractant is contacted with the brine for less than 1 minute.

10. The method according to claim 1 wherein the ratio of the aqueous brine to the organic extractant is about 4:1.

11. The method according to claim 1 wherein the brine is at a temperature of between about 50 to about 110° C. and atmospheric pressure when contacted with the organic.

12. The method according to claim 1 wherein the circuit is continuous.

13. The method according to claim 1 wherein the scrubbing step further comprises the step of contacting the organic extractant with a scrub solution at a pH of between about 2 to 5, said scrub solution containing a non-precipitating salt selected from the group consisting of NaCl, KCl, $CaCl_2$ and $NH_4Cl$.

14. The method according to claim 1 wherein the suitable salt is a non-precipitating salt selected from the group consisting of NaCl, KCl, $CaCl_2$ and $NH_4Cl$.

15. The method according to claim 1 wherein the base or precipitant of step (4) is $NaCO_3$ and $ZnCO_3$ is recovered.

16. The method according to claim 1 wherein said brine is a geothermal or synthetic brine.

17. The method according to claim 1 wherein said salt in the neutral salt solution is a non-precipitating salt selected from the group consisting of NaCl, KCl, $CaCl_2$ and $NH_4Cl$.

18. The method according to claim 1 wherein said elevated temperature ranges between about 60° C. to 20° C.

19. The method according to claim i wherein the base is CaO.

20. The method according to claim 1 wherein the base is $Ca(OH)_2$.

21. The method according to claim 1 wherein the precipitant is a carbonate such as $Na_2CO_3$.

22. The method according to claim 1 wherein the base is NaOH.

23. The method according to claim 1 wherein drying occurs at temperature of between 50° to 250° C.

24. The method according to claim 1 wherein the base or precipitant of step (4) is CaO or $Ca(OH)_2$ and $Zn(OH)_2$ is recovered.

* * * * *

UNITED STATES PATENT AND TRADEMARK OFFICE
CERTIFICATE OF CORRECTION

PATENT NO. : 5,246,684

DATED : September 21, 1993

INVENTOR(S) : Patrick M. Brown, Jerry Dobson, and James E. Reynolds

It is certified that error appears in the above-identified patent and that said Letters Patent is hereby corrected as shown below:

Col. 1, line 22, delete "39-42" and insert thereof -- $\underline{3}$:39-42 --;

Col. 1, line 29, delete "80(10):92-94" and insert thereof -- $\underline{1}80(10)$:92-94;

Col. 5, line 57, delete "low" and insert thereof -- 'low' --;

Col. 9, line 27, delete "cake" and insert thereof -- 'cake' --;

Col. 9, line 36, delete "cake" and insert thereof -- 'cake' --;

Col. 13, Table 5, line 55, under column heading "(PPM)", delete last number "13" and insert thereof -- 130 --;

Col. 16, line 1, delete "wa" and insert thereof -- was --;

Col. 21, line 11, delete "A/O" and insert thereof -- O/A --;

Col. 22, line 7, delete "14 5" and insert thereof -- 14.5 --;

Col. 23, line 15, delete "19below" and insert thereof -- 19 below --;

Col. 28, line 21, delete "20° C" and insert thereof -- 120° C --;

UNITED STATES PATENT AND TRADEMARK OFFICE
CERTIFICATE OF CORRECTION

PATENT NO. : 5,246,684
DATED : September 21, 1993
INVENTOR(S) : Patrick M. Brown, et. al.

It is certified that error appears in the above-indentified patent and that said Letters Patent is hereby corrected as shown below:

Col. 28, line 22, delete "claim i" and insert thereof -- claim 1 --.

Signed and Sealed this

Twenty-second Day of February, 1994

Attest:

BRUCE LEHMAN

*Attesting Officer*  *Commissioner of Patents and Trademarks*